Feb. 7, 1961 P. EISLER 2,971,073

ELECTRIC SURFACE HEATING DEVICES

Filed July 8, 1958 3 Sheets-Sheet 1

INVENTOR
Paul Eisler
BY A. F. Oilt
ATTORNEY

INVENTOR
Paul Eisler
BY [signature]
ATTORNEY

Feb. 7, 1961 P. EISLER 2,971,073

ELECTRIC SURFACE HEATING DEVICES

Filed July 8, 1958 3 Sheets-Sheet 3

INVENTOR
Paul Eisler
BY A. E. Oddall [signature]
ATTORNEY 2,971,073

ELECTRIC SURFACE HEATING DEVICES

Paul Eisler, 57 Exeter Road, London, England

Filed July 8, 1958, Ser. No. 747,314

Claims priority, application Great Britain July 8, 1957

16 Claims. (Cl. 219—19)

Figure 1:
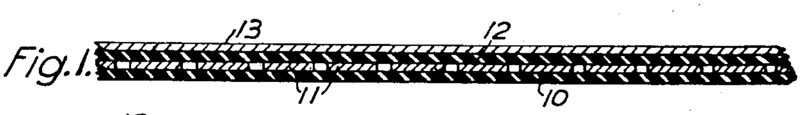

The present invention relates to improvements in the construction of electric heating elements of large surface area, particularly but not exclusively those run on mains voltage or other supply not safe to touch, and in methods of manufacture of such elements. Heating elements, heating mantles of various types, ceiling- and wall coverings for heating purposes, particularly so-called printed circuit elements, described herein as heated wall-paper, are typical applications.

By way of example the invention will be described by reference to such heated wall-paper, but it is to be understood that its scope is in no way restricted to the particular example and details given herein.

It has been suggested to use as a heating element for space heating, so-called printed circuits which contain a conductor of large area and small thickness say of metal foil or deposited metal, formed into a pattern on an insulating support and are so designed that similar heat transmission can take place from this pattern into a room, as is the case from a panel of equal area supplied with—say—hot water from a boiler, the resistance presented by the electrical circuit formed by the pattern being appropriate to the heating effect required, i.e. consuming a desired wattage when the circuit is connected to a supply of predetermined voltage such as the mains.

In order to be run at highest efficiency and speedily transfer heat into a room, it is desirable for this pattern to be as near the surface as possible, that is for instance actually on the wall or on the ceiling or on the floor, or if used as heating element for other than space heating purposes as near the object to be warmed as possible. This requirement of keeping the live pattern on or near the surface presents a safety problem even if the pattern is not bare, and the protection desired has to be sufficiently mechanically strong to prevent even accidental contact with the live element, particularly if the element is hidden by a decorative cover such as would be the case if a decorative wall-paper is placed over the printed metallic pattern.

The greatest danger of accident can conveniently be assumed to arise if some person drives a nail through the heated wall-paper while it is switched on and thus renders himself liable to an electric shock, while on the other hand dampness of the wall may cause damage to the heated wall-paper from behind. From this point of view it has been thought unavoidable to enclose such a heating element in a very strong nail-proof material unaffected by humidity which hitherto has meant very thick sheets which are costly, heavy, prevent speedy transmission of heat and render the whole method of heating less attractive.

The present invention deals with the problem of safety by putting in front of a first metal conductor of large surface and small thickness in a repeat pattern presenting the desired resistance characteristic between terminals (this conductor thus being of the class which can conveniently be referred to as a printed circuit element irrespective of the actual methods used for its production), a second metal conductor of large surface and small thickness of such form as at least to cover the pattern of the first conductor and to enable the second conductor to be reliably earthed throughout and of such character as not easily to be melted or lose contact with on object penetrating it, the two conductors being separated by a thin layer of electrical insulation at least adequate to withstand the permissible temperature limit and the normal working voltage (or such voltage as may be prescribed by regulations of the competent authority if this is greater).

The first metal conductor may desirably be of crimped or similarly deformed material. This gives a certain elasticity or yield in the general surface directions of the element. This is particularly useful where the element is likely to suffer high local forces as for instance when used under a carpet.

There is no need for the second conductor to be nail-proof and though as will become clear it need be no more in superficial form than a replica covering the pattern of the first conductor, in practice it is usually much simpler and preferable for other reasons to make it a continuous sheet. It can very suitably be a metal foil say a copper or aluminium foil of a thickness making it self-supporting and affording it perceptible strength e.g. 0.002 inch (0.05 mim.), laminated to the printed circuit pattern by means of a plastic insulating interlayer of the above specified thickness. Thus the earthed metal foil forms a reasonable sized capacitor with the metallic heating pattern which is connected to the mains.

In some cases the second conductor may be of strip form at least covering the pattern of the first conductor but presenting a longer, narrower electrical path between its ends than between opposite edges of a continuous foil.

There will generally be insulation on the back of the first metallic conductor i.e. on the side which is put against the wall in the case of a heating element so mounted. This insulation is primarily thermal and against humidity. A number of examples of it will be given later.

Figure 2:
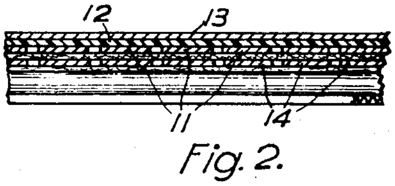
Figure 3:
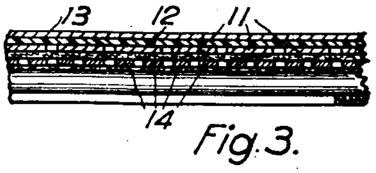
Figure 4:
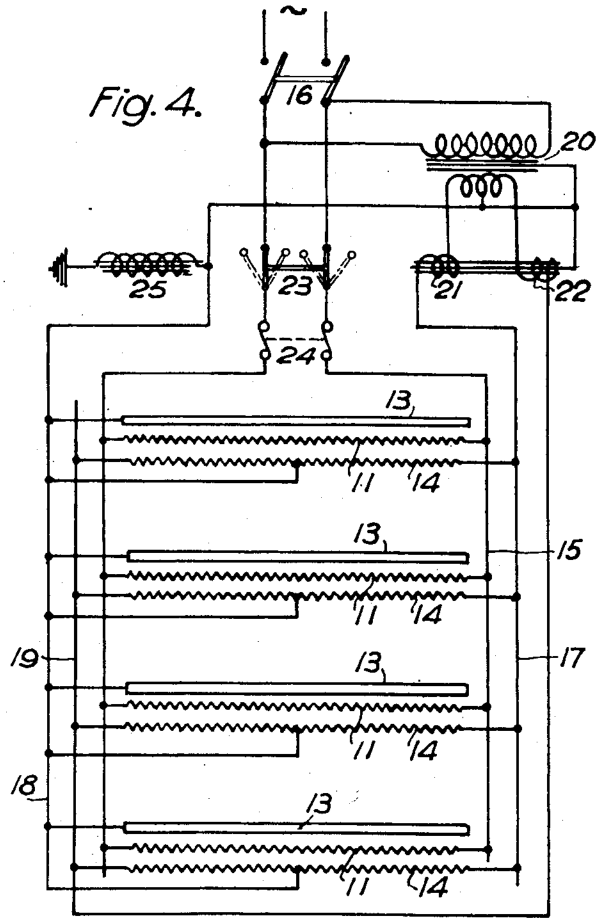
Figure 5:
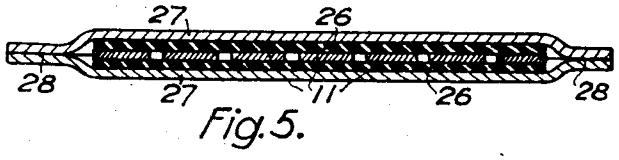
Figure 6:
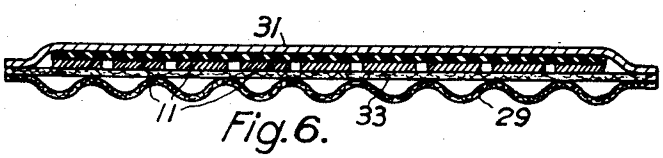
Figure 7:
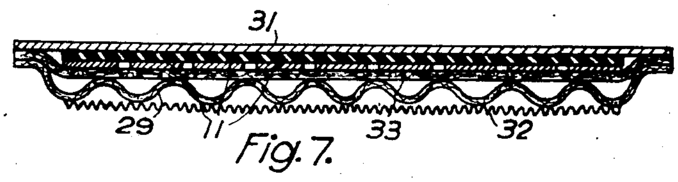
Figure 8:
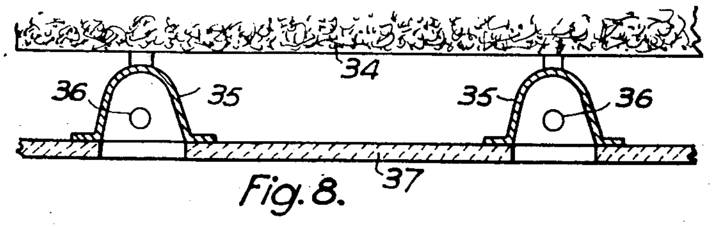
Figure 9:
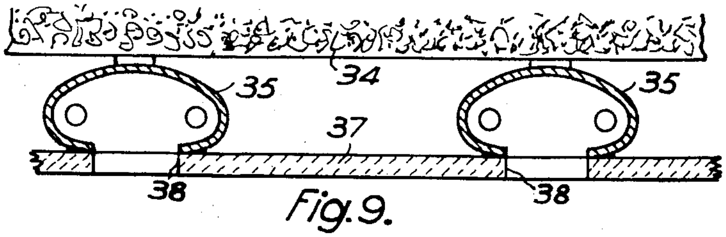
Figures 10, 12:
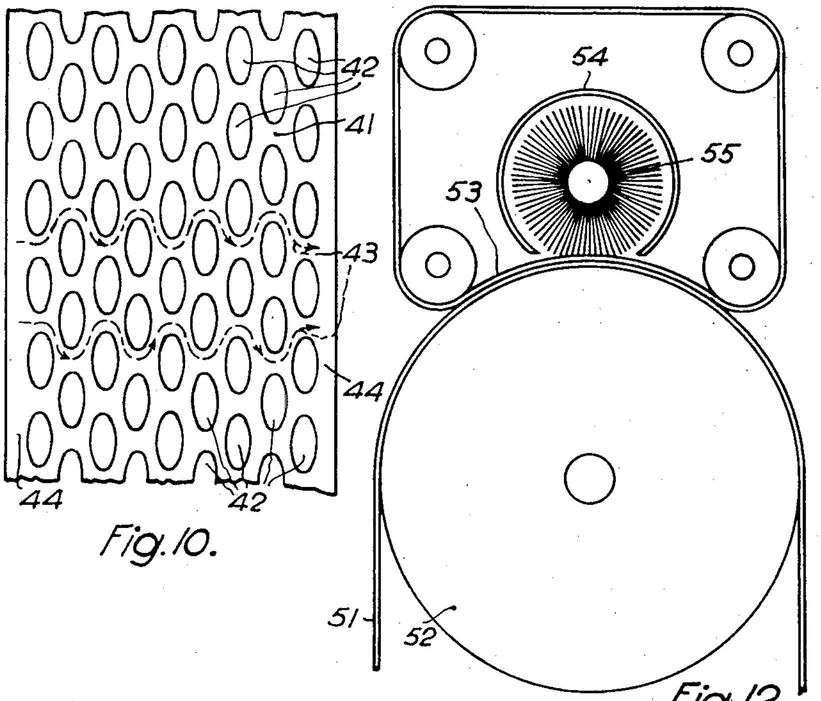
Figure 11:
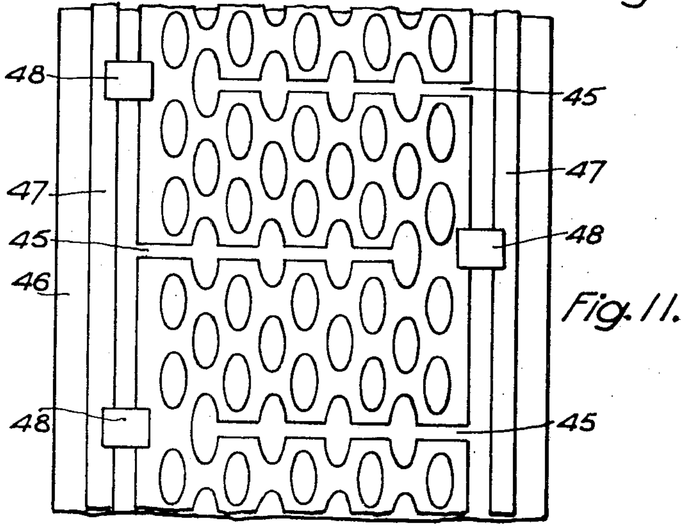

The invention will be further described with reference to some examples diagrammatically illustrated in the accompanying drawings in which Figure 1 is a section of part of a simple form of element according to the invention, Figures 2 and 3 are sections of a development providing protection particularly against danger due to local hot spots or other damage, Figure 4 is a circuit diagram incorporating a high measure of protection, Figure 5 is a transverse section and Figures 6 and 7 are much shortened longitudinal sections of other forms of element according to the invention, Figures 8 and 9 illustrate the combination of the element with lighting fittings, Figure 10 illustrates one form of pattern which the first conductor may take, Figure 11 illustrates another form of pattern particularly suitable for production on a continuous material which can be cut up to provide the first conductor in elements according to the invention, Figure 12 is a section of part of apparatus which may be used in the production of the pattern of the conductors for the elements.

As shown in Figure 1 a thin metallic resistance 11 of large area in the form of a printed circuit element having a pattern occupying most of the area covered by it is separated by a thin layer 12 of electrical insulation from an outer continuous layer 13 of metallic foil and is provided on its back with another layer 10 of sufficient electrical insulation value to prevent bridging of part of the pattern 11. At suitable points on the complete device, the pattern 11 is provided with terminals not shown for connection to a supply such as a mains supply, the resistance characteristic of the pattern being calculated to develop heat at the desired rate when connected to a source of determined voltage. The insulation 12 is of such character as to withstand a predetermined temperature and also the normal operating voltage or such higher voltage as may be prescribed.

The metal foil 13 in front of the live printed circuit element may if desired be covered with a decorative wallpaper not shown or be otherwise decorated. The foil 13 must be of sufficiently high melting point and thickness so that any accidental contact with the metallic pattern 11 underneath, for instance by a nail driven through, would not cause a hole to be burned in it as in the evaporated metal layer of a self-healing capacitor. Thus, as long as it is reliably earthed and not too brittle so as to lose contact with the nail piercing it, it will prevent a bad electric shock to the person driving a nail through it.

It will be clear that protection against the effect of an object such as a nail penetrating the foil 13 or against impact damage is obtained provided the foil 13 covers just the same pattern as the first conductor 11, and in some cases such an arrangement may be used. A continuous foil 13 is simpler however and also makes it impossible to gain access to the live conductor 11 without penetrating the foil 13.

In addition to this safety provision the invention provides a variety of safety devices which cut off the mains supply or activate a circuit breaker to the same end in the event of mechanical damage or development of hot spots. These devices use either fusible alloys or thermoplastic films.

The safety devices using fusible alloys may be in the form of whole patterned layers or small fuses. Taking the latter first the heating pattern may contain fuses which may already be part of the printed pattern or foil fuses or other fuses later assembled or a leakage trip actuated by leakage current from the earthed protective metal sheet, the fuses or trip being calculated to interrupt the circuit when a leakage current to earth occurs of a magnitude corresponding to any voltage on the protective sheet which is above that deemed safe to touch—say—45 to 50 volts. If one terminal of the printed pattern is earthed and the other is at full mains voltage, an accidental contact between a point of the printed pattern near the earthed terminal and the earthed protective metal sheet whether due to penetration or to external forces indenting the foil 13 without penetration would not be dangerous and would give rise only to a small leakage current because the major part of the resistance of the printed heating pattern remains in series with the earthed shield. The leakage trip or the fuses can therefore be dimensioned to interrupt the supply only if the short between the pattern and earth occurs at a dangerous point.

The provision of a third conductor pattern enables a still fuller measure of protection to be obtained as will now be described with reference to Figure 2. Here a layer 14 of fusible metal alloy is superimposed over but insulated from the heating pattern 11 to form a third metallic layer or conductor in the sandwich which constitutes the wall-paper or the heating device. It has the same pattern as the heating circuit 11 which is usually a meander pattern, and heating and fusible alloy pattern are very strictly superposed. However, the fusible pattern is not necessarily a replica of the heating pattern. It may have more than one line over each heater line, for instance two as in Figure 3, or it may be still further subdivided into say four or even more within the width of the heater line. These two or more narrow lines can be in series or form part of paired parallel circuits. In general the wider the lines of the heater pattern 11 the more desirable it is to subdivide the third pattern into narrower lines.

Normally the heating pattern 11 is a repeat pattern. The fusible pattern 14 is preferably divided into the same repeat areas, but is split in two pairs. A pair may extend over one, two or more repeats (or alternatively only over parts of a repeat) and consists of two continuous lines of the same resistance and preferably of the same repeat area. When the line of the fusible pattern is narrower than the line of the heating pattern a pair may consist of two separated, continuous parallel narrow lines covering the same heating pattern repeat, or of two sets of narrow lines each set having two or more narrow lines in series.

The structure shown in Figures 2 and 3 includes a corrugated backing complete by a crepe paper or the like as described later with reference to Figure 7 and the heating pattern 11 also may be crimped. The crimps and corrugations run parallel to the section shown.

While the heating pattern repeats are usually all connected in parallel to two bus bars running through them the pairs of the fusible pattern are connected, also in parallel, to four or three bus bars (there are three bus bars only when two of the four bars are common, say, earthed which is preferred). The essential features of the circuit are illustrated in Figure 4. In this figure, 11 is again the heating pattern and 13 the earthed second conductor shown here as continuous and 14 is a third pattern of fusible metal or alloy which is formed into pairs by a centre tap at each repeat.

The heating pattern 11 is connected across two bus bars 15 connected to a mains supply through double pole switch 16 the connection also including safety devices described below.

The one half of each pair into which the repeats of the pattern 14 are divided is connected to a first bus bar 17 and by the centre tap to an earthed bus bar 18 and the other half to a second bus bar 19 and the earthed bar 18. Both halves have equal resistance and are traversed by the same small current. The bus bars 17, 18 are supplied from a suitable voltage preferably a low one, supplied for example by a transformer 20 and the output leads to the bars 17, 18 are wound in opposition at 21, 22 on the iron core of a double pole circuit breaker 23 so that the two windings cancel each other's magnetic field as long as they carry the same current which is the total of the current in the half of all pairs of the installation. If this total current is reduced by the value of the current in any one half of any pair the balance is upset and the circuit breaker cuts off the main heating supply.

A break in any line of the fusible pattern 14 consequently suffices to cut off the mains. Such a break can arise by a hot spot developing in the heating pattern or in another layer, or through a fire or other outside influence. Or it may be due to a perforation being made in the wall-paper. Fusible patterns with narrow lines react at once or at any rate more quickly to a smaller perforation than do patterns with wide lines.

The fusible pattern can for instance be a pattern in a foil or film of tin or, lead, a binary or a ternary alloy and a method for its manufacture will be described later. It may be on a film of plastic or paper which also serves to separate it from the heating pattern. Any thin insulating support or layer may be used, but if it is a thermoplastic film which softens at the critical temperature that forms yet a further safety provision.

Such a thermoplastic film can also be used as the layer between the earthed second conductor e.g. of aluminium foil and the heating pattern (and preferably is used there rather than between the heating and the fusible pattern). It may be a wholly insulating film or it may be pigmented with carbon or graphite or be a semi-conductive film having a suitable temperature characteristic with or without pigments. The resistance of the film must be such that normally only a slight leakage current flows to the second conductor. Its softening at the critical temperature effects either a direct contact between the heating pattern 11 and the second conductor 13 with the same consequences as if a nail had been driven through both or a drastic lowering of the resistance had occurred between the two layers. This would cause fuses 24 on both poles to blow and it can also be used to cut off the main's supply by a further circuit breaker coil 25. Blowing of both fuses can be ensured by using foil or similar fuses on opposite sides of a thin insulating barrier. The softening of the film can be a consequence of a hot spot or be caused by external forces. Excessive pressure without heat softening of the plastic film can also cause contact or an approach to near contact of the first and second conductor layers; any breakdown of the high resistance of the film, be it through mechanical force or due to the temperature sensitive nature of its insulating, high resistance or semiconductive material can be used to activate the relay which will cause the mains supply to be cut off and may also give an alarm.

Where the element is to be mounted on a supporting surface of such nature as not to cause electrical bridging of the pattern of the first conductor or to damage it chemically or physically, an insulation on the back of the element can be dispensed with but as a general rule some protection will be necessary.

There are a number of variants possible for such layers which come between the metallic heating pattern and the wall or the other support. Thus as in Figure 5 the heating element 11 may be sandwiched between two insulating layers 26 say two papers and two foils 27, or thin metal strips, these foils or strips being welded or otherwise sealed together at the edges 28 but insulated from the heating pattern and thus enclosing the heating element hermetically on all sides. Either outer foil 27 can serve as the second conductor and the structure may be symmetrical, i.e. both papers and outer foils being identical.

The decorative treatment of the metal foil forming the complete envelope can be arranged to assist the desired directional heat transfer by giving the front foil a good emissive surface and the foil towards the wall a bad emissive surface. However, this colour treatment is less effective in directional effect on the heat transfer which in most cases is desired mainly through the front foil, than a structural differentiation between front and back of a wall heating element.

Total enclosure in metal foil is not necessary for safety purposes. The use of the earthed front foil or front metal strip satisfies safety requirements. On the back of the live metallic heating pattern, that is on the side towards the wall, as in Figure 1 there can be any layer providing sufficient electrical insulation to avoid bridging parts of the pattern, good thermal insulation, protection from humidity and desirably making a hermetic seal with the front foil at the edges of the element which is preferably in strip form. Waterproofed paper, varnish coated paper, porous plastic are examples of suitable back coverings.

The present invention, however, proposes some new coverings for this purpose as alternatives and improvements. Thus there is shown by way of example in Figure 6 a construction comprising a backing layer having a flat base part 33 of paper or metal and strips 29 of corrugated paper or corrugated metal, the said backing layer being sealed or welded to the front foil 31 at the edges thereof. The corrugated paper 29 and base part 33 may be coated with varnish or plastic film or may be impregnated to be waterproof. A new type of corrugated paper, sold under the name "Carbion" (obtainable from Spicer's Ltd. of 19 New Bridge Street, London, E.C. 4) may be used and is preferred where improved mechanical strength is desired.

A further development shown in Figure 7 is the provision of an extensible material 32 e.g. creped material such as crepe paper, preferably waterproofed, stuck to the corrugated paper 29, so as to form a connecting link over the outer crests of the corrugations opposite its flat paper base part 33 which is laminated to the metallic heating pattern 11. This crepe paper desirably has its folds or crimps parallel to the corrugations of the material 29 and so leaves the whole strip pliable so that it can be rolled. If the pattern 11 is crimped, preferably the crimping runs parallel to the corrugations. If a flat sheet of paper were used to connect the crests of the corrugations instead of a creped paper, a corrugated board would be formed as the back cover, and this material would be too stiff to permit rolling up of the whole strip.

The element can be stuck directly to a wall or if a distance greater than provided by the corrugated member is required, it can be fixed to the wall by means of laths which space it by the desired additional air gap.

For fixing to a ceiling 34 Figure 8 the spacing can be provided by the reflectors 35 or the like for lamps e.g. tubular lamps 36, secured to the edges of some of the heating elements 37 and thus combined heating and lighting fixtures can be produced. Recessing of the lamps 36 behind the edges 38 of the heating strips 37 as in Figure 9 can be arranged to give concealed lighting effects. For such fixtures it is possible to utilize the metallic heating pattern to form a part of the inductance and/or capacitance required in the operation of fluorescent lighting.

It may be here mentioned that the capacitance of the heating element is desirable also for power factor improvement on A.C. mains particularly in heating systems such as those described in my copending application Serial No. 752,384, filed August 31, 1958, having transformers of low power factor.

Each repeat of the pattern which the first conductor takes will in general be a meander pattern and Figure 10 illustrates a simple and convenient form. In this a continuous metallic foil 41 is interrupted by relatively staggered but otherwise identical rows of slots 42. It will be understood that the slots 42 are shown very short in proportion for convenience in illustration. In a practical pattern they would be much longer. This produces a sequence of meandering paths such as indicated by the arrowed lines 43 extending between the lateral edge areas 44 so that the latter can serve as terminal areas for any number of paths electrically in parallel. Further the number of paths will be proportional to the length of the foil so that the total load on a given voltage will be proportional to the total area, i.e. other conditions remaining the same such a pattern gives a substantially constant dissipation of heat per unit area. If the foil 41 is crimped the crimps preferably run transverse to the limbs of the meander paths i.e. in the figure horizontally across between the lateral areas 44.

This pattern can be developed however to enable variations in loading to be obtained.

Thus as shown in Figure 11 the repeat is a pattern formed on the lines of Figure 10 but further slotted at 45 to divide it into a zig-zag sequence. The repeat may be every few inches or centimetres. This pattern is carried on an insulating support 46 on both edges of which is a wide conductive line 47, and the pattern forms a continuous resistance consisting of a plurality of meander paths in parallel. The pattern can however be connected to both lines 47 at every repeat distance as at 48 thus permitting the strip to be cut off into any length forming a multiple of the repeat distance.

So connected the pattern provides the maximum loading and is substantially equivalent to the pattern shown in Figure 10. But if the connections 48 are reduced in number each branch across the lines 47 will include more lines of the zig-zag in series. In this way the loading can be reduced. With the pattern shown each branch can be made to consist of an odd number of zig-zag limbs, but other patterns can be developed enabling even numbers of limbs to be connected instead or in addition. Also more longitudinal lines can be provided for example an additional one along the centre.

The connections 48 between zig-zag limbs and the border lines 47 can be effected by fixing, for instance, by soldering on connecting links or preferably fusible elements such as foil fuses prior to cutting the strips into desired lengths.

Alternatively the repeat pattern may already be linked to the lines along the edges of the strip (and/or on very wide strips to central longitudinal lines) by connections inherent in the pattern itself. All or some of these connecting links can be fusible elements, that is they are so dimensioned that the earth current would rupture them. In this type the series connection of limbs of the zig-zag is effected by cutting and perforating the strip at the locations of the respective connecting links or otherwise removing the link.

The metallic pattern forming the heating element need not necessarily be a meander pattern having no appreciable inductance. It can take the form of a coil and thus be a combined resistance and inductive element as well as being of appreciable capacitance, and all these features can be made use of for the heating purpose. A two-layer pattern of S-coils totally enclosed in an enveloping steel strip can have an appreciable inductance and create part of its heat by induced currents in the metallic envelope. Such a two layer pattern can be produced by folding an insulating layer carrying two lines of S-coils side by side, and this can be produced by the method described later herein.

A pliable heating element which can be rolled up, may be used in the form of a scroll or blind in front of windows or in other places on the wall. The front foil may be decorated with a picture, with a geographical map, with a wall-paper or with flock sprayed on to give the appearance of a wall carpet. Elements suitably decorated may be put on screens, on doors, at the bottom and back of beds, settees and chairs. They may be used for warm-plates and warm-shelves, where things have to be kept warm, such as shelves in food trolleys. Totally enclosed foil strip heating elements may also be used in heating mantles, in immersion heaters and a variety of special heating appliances.

In their simplest forms they consist of five layers laminated together as in Figure 5, two outer layers of metal foil being the widest and hermetically sealed together on the edges, two distancing insulating layers of paper or film narrower than the outer foils, but wider than the innermost layer formed by the metallic heating pattern which is connected to the mains, while the outer foils are firmly connected to earth. The total thickness of this five-layer material can be so small that it can constitute an easily rollable and very inexpensively produced surface element.

While the described features of the invention are particularly useful for elements connected to the mains or a high voltage, it is to be understood that they can also be made with a resistance suitable for low voltage operation and that the present invention covers these also.

Any of the constructions can be provided with the protection above described with reference to Figure 4. For example in a structure otherwise as in Figure 5, a thin paper having a heating pattern on its front and a fusible pattern on its back may be enclosed between two aluminium foils separated from the two metal patterns by two thermoplastic films. Or where a continuous foil on the wall side is not needed there may be a thin paper carrying the fusible pattern facing the wall and if desired a further covering as in Figure 2 or 3 may be provided.

The invention also includes a method of producing the patterned conductors for the heating elemen. This method can be used for producing the first conductor, but where the second conductor is patterned the same method can be used to produce it, and it can also be used for the fusible third conductor. According to this method a continuous metal coating on an insulating support has those parts which need to be bare in the pattern removed by the application of frictional energy. This energy may be applied by brushing, polishing or abrasive action. This frictional energy exerts not only mechanical forces on the metallic areas, but generates heat as well which assists in removing them.

As shown in Figure 12, the metal coated support 51 say lead foil bonded to kraft paper is taken over a curved support 52 such as a roller, with the paper lying on the roller, while a stencil 53 presses against the metal coating. The stencil covers all the areas of the metal coating which are to be protected and which are to be preserved in the pattern. It leaves metal showing through and delimited by the openings in the stencil. Through these openings a rotary brush or mop 55 acts on the metal coating in the openings. The brush or mop rotates with high speed and partly melts, partly tears away the exposed metal coating from the insulator 51 where it contacts it, that is in the areas delimited by the openings in the stencil. If instead of lead foil a metal foil or metal layer having a higher melting part is used, it might be desirable to enhance the heat created by the friction of the brush by using a heated wire brush or alternatively playing a flame in front of the brush.

In place of a rotary brush or mop a stream of high energy abrasive particles from a jet may be caused to impinge on the metal coating in the openings.

The stencil 53 which can be an endless belt, can be made of strong metal foil of high melting point, for instance copper or nickel or steel foil, and may contain bridge pieces to render it more solid or ensure its coherence. If bridge pieces are employed the pattern is made in two stages using two stencils in succession and register on the same strip, the second stencil having an opening where the first had a bridge piece.

A convenient way to make the stencil is to use a copper foil on a temporary base, print the stencil design on the copper foil in a protective ink and etch the openings out, then remove the temporary base and make the stencil into an endless band moving round the brush.

For the provision of sharp edges in the pattern it is sometimes desirable to provide the stencil with rims or sharp edges so that the metal layer against which it presses, is indented or cut in along the outline of the pattern. The mechanical action of the brush can in this case remove the metal in the opening more by means of a stripping action or the like than by the help of the frictional heat.

When the rotating wire brush 55 is heated, the heat can be supplied through the axis of the brush. However, loss of heat must be prevented before it reaches the tips of the wire bristles, and for that purpose not only insulation but a heating mantle 54 is preferably put round the rotary wire brush, leaving only a small angle uncovered through which the bristles contact the stencil and the metallized insulator to be patterned.

Instead of lead foil paper, a lead-mud paper is a preferred raw material for a heating element to be patterned according to the invention. Lead-mud paper is produced in a similar way as the tin-mud paper which has been widely used for making capacitors. This tin-mud paper was produced by coating ordinary paper with a slurry containing tin powders in a thin aqueous adhesive and friction-calendering the coated sheet so heavily that the tin particles formed a coherent coating.

Lead-mud paper would be produced by using lead-mud powders instead of tin-mud powders, and it is more suitable than tin-mud paper for heating elements, because of the higher melting point, better corrosion resistance and higher electrical resistance of lead.

The invention is not restricted to these relatively low melting metals and alloys. The removal of the metallic layer through the openings of a suitable stencil by the brushing, polishing and abrasive action is applicable to higher melting metals as well, particularly if the indenting action of the stencil or masking tool is utilized and the bonding of the adhesive layer to the insulator is made so as to soften or lose its bond at the temperature developed on the frictional contact area.

Instead of a stencil as described above, other suitable masking tools or guides for the abrasive polishing or brushing action can be used.

I claim:

1. An electrical resistance heating element of large surface area and small thickness including in its structure a first metal conductor of large surface area and small thickness in a repeat pattern presenting the desired resistance characteristic between terminals, a second metal conductor of large surface area and small thickness of such form as at least to cover the pattern of the first conductor and to enable the second conductor to remain earthed throughout, insulating material disposed between said first and second conductors so as to insulate them from each other, and means for interrupting the supply to the first conductor in the case of an external action causing a small local connection between a point at high potential of the first conductor and the earthed second conductor to be made, the thickness, structure and material of the second conductor and the operating time of said interrupting means ensuring that such connection between the first and second conductors will persist at least for the period necessary for said interrupting means to operate.

2. A heating element according to claim 1 in which the second conductor is a metal foil of higher conductivity and higher melting point than the first conductor and is of a thickness making it self-supporting and affording it perceptible strength.

3. A heating element according to claim 1 in which the second conductor is a continuous sheet of higher melting point than the first conductor and a similar continuous thin metal sheet is provided over a layer of insulation on the back of the first conductor, these two sheets being sealed together at the edges to form a hermetic enclosure of the first conductor, but being insulated from the latter.

4. A heating element according to claim 1 in which the first conductor is constituted by a single integral sheet of material which is formed to provide a repeating meander pattern presenting a number of electrical paths in parallel.

5. A heating element according to claim 1 in which the back of the element is provided with a covering which includes a layer of corrugated material.

6. A heating element according to claim 5 including a layer of extensible material joining the outer crests of the layer of corrugated material.

7. A heating element according to claim 1 in which a fuse and a leakage trip actuated by a current from the second conductor to earth are included in the circuit of the heating element, which fuse and trip interrupt the circuit of the first conductor if with the second conductor earthed a leakage current from the second conductor flows to earth which corresponds to a critical fall of the resistance within the heating element.

8. A heating element according to claim 7 in which at least one fuse of the specified value is formed by part of the pattern of the first conductor.

9. A heating element according to claim 1 also including a third conductor of fusible material in a pattern accurately superposed over but insulated from that of the first conductor.

10. A heating element according to claim 9 in which at least some parts of the pattern of the third conductor superposed over a single line of the pattern of the first conductor consists of a plurality of narrower lines.

11. A combination including a heating element according to claim 9 in which each repeat of the pattern of the third conductor is divided into two branches traversed in operation by a small current, and a circuit breaker including two coils acting in opposition through which the current in the two branches passed said circuit breaker controlling the supply to the element so that the breaker only responds if the normal balance between the two coils is disturbed, e.g. by damage to one branch of a repeat of the pattern of the third conductor.

12. An electrical resistance heating element of large surface area and small thickness including in its structure a first metal conductor of large surface and small thickness in a repeat pattern presenting the desired resistance characteristic between terminals, at least one other metal conductor of large surface and small thickness of such form as at least to cover the pattern of the first conductor a thin layer of temperature sensitive insulation between said first conductor and said other conductor which at a pre-determined temperature softens sufficiently to permit a heavy flow of current between the first and other conductors, and means actuated by such heavy current for interrupting the supply to the first conductor, the thickness, structure and material of such other conductor and the operating time of said interrupting means ensuring that such heavy current will persist at least for the period necessary for said interrupting means to operate.

13. A heating element according to claim 12 in which the layer of temperature sensitive insulation is of very high resistance so that normally only a slight leakage current flows but if the two conductors are caused to come nearly into contact due to external force the fall in resistance permits a sufficient current to flow to cause the supply to be cut off.

14. A heating element according to claim 1 in which a reflector for a lamp is secured to the heating element outwardly thereof.

15. A combination of heating element and reflector according to claim 14 in which the first conductor forms part of the impedance required for a fluorescent lamp.

16. A continuous material for the production of a heating element according to claim 1 comprising a continuous flexible insulating support bearing a continuous thin metallic meander pattern repeating at short intervals and a continuous wide conductive line on each side of the meander pattern separate therefrom.

References Cited in the file of this patent

UNITED STATES PATENTS

| | | |
|---|---|---|
| 1,317,659 | Charles | Sept. 30, 1919 |
| 1,521,241 | Hale | Dec. 30, 1924 |
| 1,996,522 | Norris | Apr. 2, 1935 |
| 2,110,660 | Doczekal | Mar. 8, 1938 |
| 2,503,601 | Tice | Apr. 11, 1950 |
| 2,622,178 | Glynn | Dec. 16, 1952 |
| 2,680,800 | Chandler | June 8, 1954 |
| 2,745,942 | Cohen | May 15, 1956 |
| 2,845,519 | Willat | July 29, 1958 |
| 2,846,801 | Brown | Aug. 12, 1958 |

FOREIGN PATENTS

| | | |
|---|---|---|
| 447,453 | Great Britain | May 19, 1936 |
| 639,206 | Germany | Dec. 1, 1936 |
| 641,679 | Germany | Feb. 9, 1937 |
| 713,684 | Great Britain | Aug. 18, 1954 |
| 743,911 | France | Jan. 16, 1933 |